(12) United States Patent
Ben Shlush et al.

(10) Patent No.: US 9,204,303 B2
(45) Date of Patent: Dec. 1, 2015

(54) METHODS AND SYSTEMS FOR ROUTING AUTHENTICATION AND/OR IDENTIFICATION DATA OF A CELLULAR SUBSCRIBER

(76) Inventors: Avi Ben Shlush, Pardes Hana (IL); Eyal Shmueli, Kfar-Gibton (IL)

( * ) Notice: Subject to any disclaimer, the term of this patent is extended or adjusted under 35 U.S.C. 154(b) by 0 days.

(21) Appl. No.: 14/111,815

(22) PCT Filed: Feb. 9, 2012

(86) PCT No.: PCT/IL2012/050042
§ 371 (c)(1),
(2), (4) Date: Oct. 15, 2013

(87) PCT Pub. No.: WO2012/140654
PCT Pub. Date: Oct. 18, 2012

(65) Prior Publication Data
US 2014/0051398 A1    Feb. 20, 2014

Related U.S. Application Data

(60) Provisional application No. 61/475,267, filed on Apr. 14, 2011.

(51) Int. Cl.
*H04M 1/68* (2006.01)
*H04W 12/06* (2009.01)
(Continued)

(52) U.S. Cl.
CPC .............. *H04W 12/06* (2013.01); *H04W 8/12* (2013.01); *H04L 63/0853* (2013.01); *H04L 63/18* (2013.01)

(58) Field of Classification Search
CPC ... H04L 63/0853; H04L 63/18; H04W 12/06; H04W 8/12

USPC .......................................................... 455/458
See application file for complete search history.

(56) References Cited

U.S. PATENT DOCUMENTS

| 7,336,941 | B1  | 2/2008 | Clingerman et al. |
| 2004/0023689 | A1* | 2/2004 | Ahonen ........................ 455/558 |

FOREIGN PATENT DOCUMENTS

| WO | WO 2006/094564 | 9/2006 |
| WO | WO 2009/133410 | 11/2009 |

(Continued)

OTHER PUBLICATIONS

Communication Relating to the Results of the Partial International Search Dated Jun. 22, 2012 From the International Searching Authority Re. Application No. PCT/IL2012/050042.

(Continued)

*Primary Examiner* — Babar Sarwar
(74) *Attorney, Agent, or Firm* — PRTSI, Inc.; Martin D. Moynihan

(57) ABSTRACT

A system for registering a cellular device. The system comprises a non cellular communication module which establishes a non cellular communication connection with a remote network node over a non cellular communication network and acquires identification and/or authentication data of a subscriber of a visited cellular network from the remote network node over the non cellular communication connection, a subscriber authentication unit adaptor configured for engaging with contacts of a subscriber authentication unit socket of a hosting cellular device, and a managing module which receives the identification and/or authentication data from the non cellular communication module and provides the identification and/or authentication data to the hosting cellular communication via the authentication unit adaptor so as to allow to registering the hosting cellular communication to the visited cellular network.

17 Claims, 8 Drawing Sheets

(51) Int. Cl.
 *H04W 8/12* (2009.01)
 *H04L 29/06* (2006.01)

(56) References Cited

FOREIGN PATENT DOCUMENTS

WO    WO 2009133410 A2 *  11/2009
WO    WO 2012/140654       10/2012

OTHER PUBLICATIONS

International Search Report and the Written Opinion Dated Aug. 29, 2012 From the International Searching Authority Re. Application No. PCT/IL2012/050042.

International Preliminary Report on Patentability Dated Oct. 24, 2013 From the International Bureau of WIPO Re. Application No. PCT/IL2012/050042.

* cited by examiner

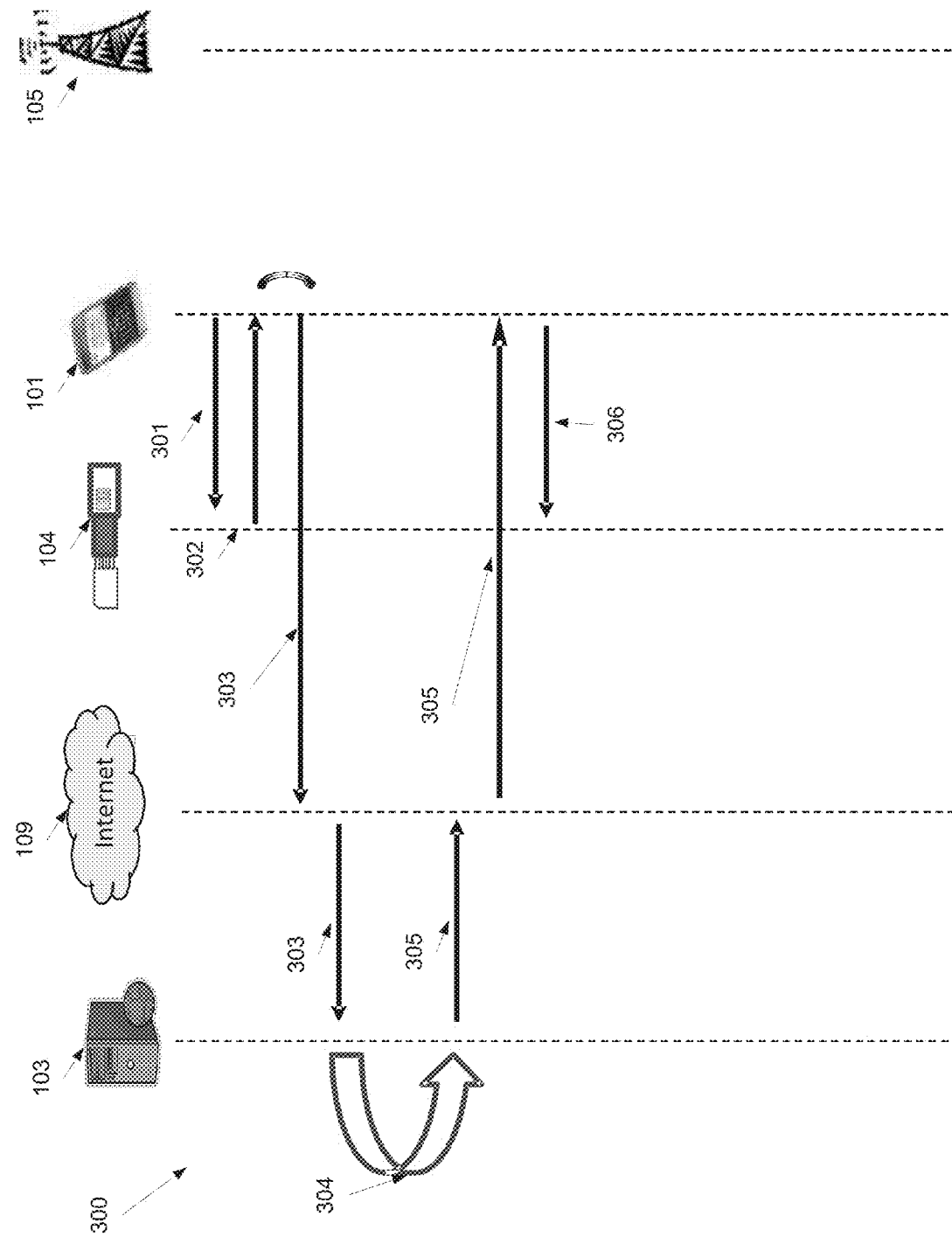

METHODS AND SYSTEMS FOR ROUTING AUTHENTICATION AND/OR IDENTIFICATION DATA OF A CELLULAR SUBSCRIBER

RELATED APPLICATIONS

This application is a National Phase of PCT Patent Application No. PCT/IL2012/50042 having International filing date of Feb. 9, 2012, which claims the benefit priority under 35 USC §119(e) of U.S. Provisional Patent Application No. 61/475,267 filed on Apr. 14, 2011. The contents of the above applications are all incorporated by reference as if fully set forth herein in their entirety.

FIELD AND BACKGROUND OF THE INVENTION

The present invention, in some embodiments thereof, relates to wireless communication and, more particularly, but not exclusively, to methods and systems to establish communication sessions with cellular network subscribers.

As commonly known, there are many mobile or cellular network operators, or providers, in the world, usually more than one in a single country. These network operators include, but are not limited to, operators who provide mobility services using global system for mobile communications (GSM), general packet radio service (GPRS), third generation (3G), code division multiple access (CDMA), time division multiple access (TDMA), time division multiple access (PHS), wideband CDMA (WCDMA), integrated digital enhanced network (IDEN) and wireless local loop (WLL) technologies or their variants. These network operators provide voice, cellular messaging and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

A cellular network with which a cellular subscriber has a direct billing relationship is often referred to as the Home Public Mobile Network (HPMN) or as the home network of the subscriber. If the subscriber is in a network with which it does not have a direct billing relationship, the serving network is referred to as the Visited Public Mobile Network (VPMN) or as the visited network. The subscriber is referred to as an inbound roamer by the VPMN. The same subscriber is referred to as an outbound roamer by the HPMN. In such a case, the inbound roamers are treated as temporary subscribers from a service availability perspective, while the billing for usage incurred by them is through inter-carrier settlements via the home network of the subscriber.

As commonly known, wireless networks use numeric identifiers to communicate with Mobile Stations (MS) over an air interface. Messages or communications exchanged between the wireless network and MS contain remotely acquired authentication data that permits the network to distinguish between different MS while performing operations related to calls and roaming. For example, GSM based wireless networks are specified to support an international mobile station identity (IMSI) as the identifier for MS so that service can be provided to international roamers. The IMSI is a unique identifier up to 15 digits in length allocated to each mobile subscriber.

SUMMARY OF THE INVENTION

According to an aspect of some embodiments of the present invention there is provided a system for registering a cellular device. The system comprises a non cellular communication module which establishes a non cellular communication connection with a remote network node over a non cellular communication network and acquires identification and/or authentication data of a subscriber of a visited cellular network from the remote network node over the non cellular communication connection, a subscriber authentication unit adaptor configured for engaging with contacts of a subscriber authentication unit socket of a hosting cellular device, and a managing module which receives the identification and/or authentication data from the non cellular communication module and provides the identification and/or authentication data to the hosting cellular communication via the authentication unit adaptor so as to allow to registering the hosting cellular communication to the visited cellular network.

Optionally, the non cellular communication module being installed on the hosting cellular device.

More optionally, the non cellular communication module acquires the identification and/or authentication data via a communication port of the hosting cellular device.

More optionally, the subscriber authentication unit adaptor and a communication interface which receives the identification and/or authentication data from the non cellular communication module.

Optionally, the identification and/or authentication data comprises an international mobile subscriber identity (IMSI).

More optionally, the communication interface comprises a wireless communication unit for establishing a wireless connection with the hosting cellular device, the identification and/or authentication data being provided via the wireless connection.

Optionally, the non cellular communication module acquires the identification and/or authentication data by establishing a non cellular communication session with the remote network node using a non cellular communication interface of the hosting cellular device.

More optionally, the socket communication device is energized via the subscriber authentication unit adaptor, by a power source of the hosting cellular device.

More optionally, the socket communication device is sized and shaped to fit into the subscriber authentication unit socket.

Optionally, the subscriber authentication unit socket is a subscriber identification module (SIM) card socket.

Optionally, the subscriber authentication unit adaptor and the managing module are installed in a socket communication device which further comprises an integrated subscriber identification module (SIM) card socket for engaging with contacts of a SIM card hosting a on-chip authentication data, the socket communication device provides the on-chip identification and/or authentication data via the subscriber authentication unit adaptor to register the on-chip identification and/or authentication data in a home cellular network.

More optionally, the socket communication device further comprises a switch for switching between a first connection between the integrated SIM card socket and the subscriber authentication unit adaptor and a second connection between the managing module and the subscriber authentication unit adaptor.

According to an aspect of some embodiments of the present invention there is provided a method for registering a cellular device. The method comprises establishing a non cellular communication connection over a non cellular communication network with a remote network node, acquiring identification and/or authentication data of a subscriber of a visited cellular network from the remote network node over the non cellular communication connection, forwarding the identification and/or authentication data to a hosting cellular device via a subscriber authentication unit socket thereof, and registering the hosting cellular device to the visited cellular network using the authentication data.

Optionally, detecting an initiation of a roaming process on the hosting cellular device and halting the roaming process in response to the detection.

Optionally, using an integrated subscriber authentication unit socket to acquire on-chip identification and/or authentication data from a subscriber authentication unit engaged therewith; wherein the registering comprises identifying a location of the hosting cellular device and determining accordingly whether to provide the identification and/or authentication data or the on-chip identification and/or authentication data to the hosting cellular device via the subscriber authentication unit socket.

Optionally, the method further comprises using the non cellular communication connection to acquire an additional identification and/or authentication data from the remote network node, providing the hosting cellular device with the additional identification and/or authentication data via the subscriber authentication unit socket to registering the hosting cellular device to another visited cellular network using the additional identification and/or authentication data.

According to an aspect of some embodiments of the present invention there is provided a method for registering a cellular device. The method comprises establishing a non cellular communication connection over a non cellular communication network between a cellular device and a remote network node, receiving from a visited cellular network, at the cellular device, at least one request for at least one of identification and authentication of a subscriber during a network registration process, routing the at least one request, via the non cellular communication connection, to the remote network node, and routing at least one response to the at least one request, via the non cellular communication connection, to the visited network so as to register the cellular device to the visited cellular network.

Optionally, the routing at least one response comprises routing the at least one response via a subscriber authentication unit socket of the cellular device.

According to an aspect of some embodiments of the present invention there is provided a method for registering a gateway as a cellular device in a home cellular network. The method comprises establishing a communication connection over a communication network between a cellular device and a gateway, receiving from a home cellular network, at the gateway, at least one request for at least one of identification and authentication of a subscriber during a network registration process, routing the at least one request, via the communication connection, to the cellular device, routing at least one response to the at least one request, via the communication connection, to the home cellular network so as to register the gateway to the home cellular network, and connecting local calls received at the gateway via the home cellular network to the cellular device.

Optionally, the connecting is performed by using an international leg of a cellular service provider.

Optionally, the connecting is performed via the communication connection which is a cellular communication connection.

Optionally, the communication connection is a non cellular communication connection.

Optionally, the at least one request comprises routing the at least one request via a subscriber authentication unit socket of the cellular device.

According to an aspect of some embodiments of the present invention there is provided a subscriber authentication unit socket communication device. The subscriber authentication unit socket communication device comprises a subscriber authentication unit adaptor for engaging with contacts of a subscriber authentication unit socket of a hosting cellular device, a non cellular communication interface for receiving an remotely acquired identification and/or authentication data of a subscriber of a visited cellular network from a remote network node over a non cellular communication connection, and a support element which physically connects the subscriber authentication unit adaptor and the non cellular communication interface.

Optionally, the subscriber authentication unit adaptor is sized and shaped to engage with contacts of a subscriber identification module (SIM) card socket.

According to an aspect of some embodiments of the present invention there is provided a system for establishing a communication session between cellular peers. The system comprises a socket communication device, engaged with a subscriber authentication unit socket of a cellular device to provide, via the subscriber authentication unit socket, remotely acquired identification and/or authentication data for registration of a user with a first cellular network, a first gateway, connected to a first cellular network, which registers on-chip identification and/or authentication data associated with the user with the first cellular network and a second gateway connected to a second cellular network. The first gateway establishes a voice over internet protocol (VoIP) connection with the second gateway when a call is received for the user from a peer so as to establish a communication session between the user and the peer using the VoIP connection, over the first and second cellular networks.

Optionally, the system further comprises a network node which transmits the remotely acquired identification and/or authentication data over a non cellular connection with the cellular device, the cellular device forwards the remotely acquired identification and/or authentication data to the socket communication device.

According to an aspect of some embodiments of the present invention there is provided a method for registering a multi SIM cellular device having at least first and second SIM card sockets each associated with another mobile communication circuit. The method comprises establishing a first cellular communication connection using a home SIM card installed in the first SIM card socket over a visited cellular communication network with a remote network node, acquiring identification and/or authentication data of a subscriber of the visited cellular communication network from the remote network node over the first cellular communication connection, forwarding the identification and/or authentication data via a second SIM card socket of the multi SIM cellular device, and registering the multi SIM cellular device to the visited cellular network using the identification and/or authentication data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A and 4B are sequence diagrams of processes of a method for registering remotely a cellular device using remotely acquired identification and/or authentication data, according to some embodiments of the present invention;

DESCRIPTION OF EMBODIMENTS OF THE INVENTION

Figure 1A:
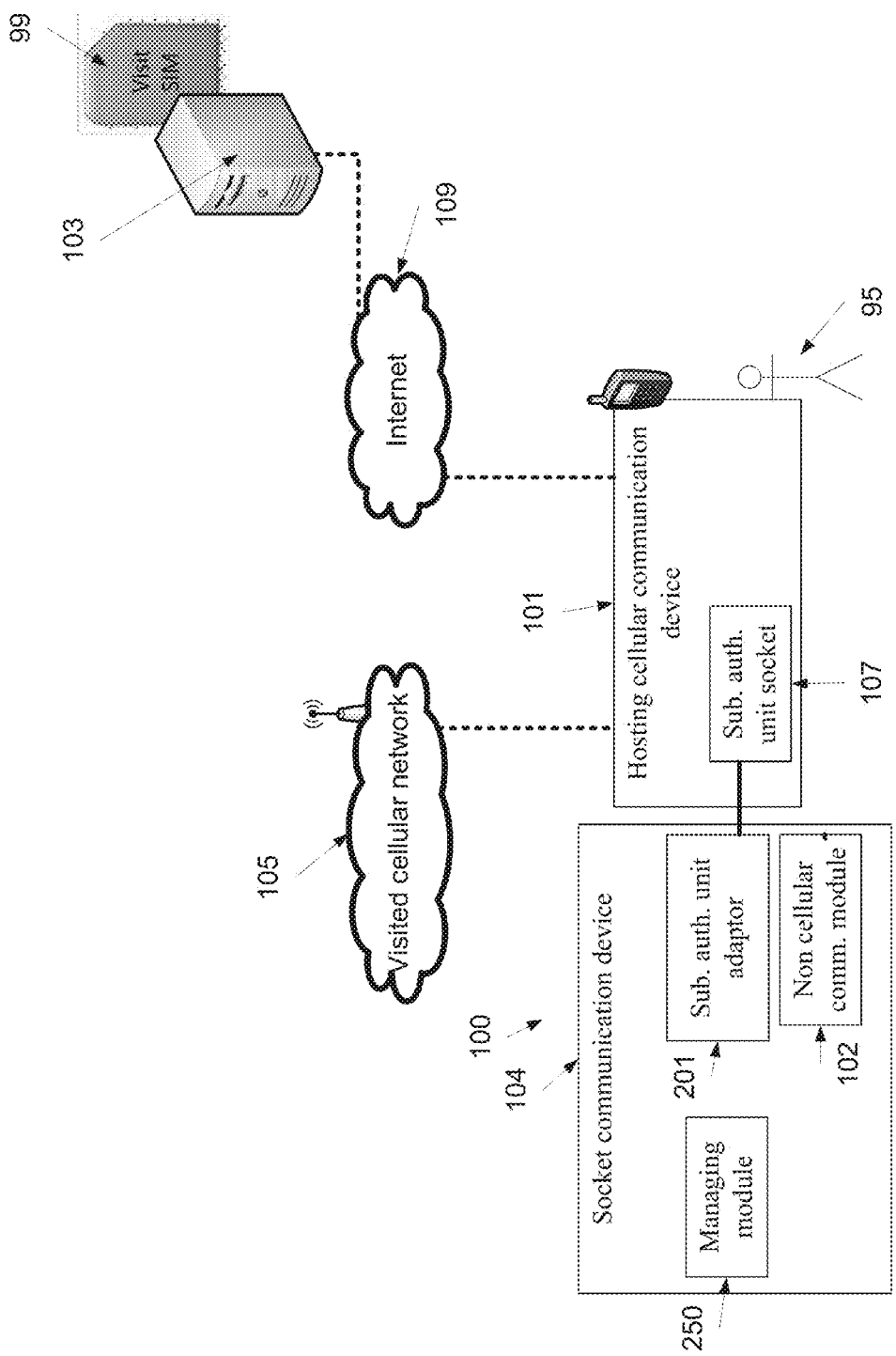
FIGS. 1A and 1B are schematic illustrations of systems for acquiring identification and/or authentication data of a subscriber of visiting cellular network to register a cellular device to a visiting user, according to some embodiments of the present invention.

The present invention, in some embodiments thereof, relates to wireless communication and, more particularly, but not exclusively, to methods and systems to establish communication sessions with cellular network subscribers.

According to some embodiments of the present invention, there is provided methods and systems of registering cellular communication devices, referred to herein as cellular devices, to a visited cellular network. The system connects between a network node that manages a plurality of subscriber identities, such as subscriber identification module (SIM) data and a cellular network in a manner that allows routing identification and authentication requests and replies therebetween. The routing is performed via a cellular device so as to allow registering the cellular device to the visited network as a cellular device of a local (i.e. non-roaming) subscriber.

In use, the system establishes non cellular communication for acquiring an identification and/or authentication data of a subscriber of a visited cellular network, such as an international mobile subscriber identity (IMSI), and forwarding the remotely acquired identification and/or authentication data via a subscriber authentication unit socket, such as a SIM card socket, to a hosting cellular device, for example in response to a request for authentication, to allow the registration thereof. The remotely acquired identification and/or authentication data is optionally wirelessly received from a network node, such as a web server, that manages the allocation of a plurality of subscriber identification and/or authentication data in various cellular devices of a plurality of travelling, for example roaming, users. The remotely acquired identification and/or authentication data allows the cellular device to be registered at the visited cellular network. In such a manner, the cellular device may receive non roaming cellular services at the geographic location of its user. The system may allow the user to receive cellular services from the visited cellular network without incurring roaming charges.

According to some embodiments of the present invention, the system includes a non cellular communication module, which is installed in the cellular device, to acquire the subscriber identification and/or authentication data from the remote network node via a communication port of a hosting cellular device, for example using the wireless local area network services of the hosting cellular device. The system further includes an adaptor engaged with contacts of a subscriber authentication unit socket, such as a SIM card socket, of the hosting cellular device. The socket communication device further includes a communication interface which receives the remotely acquired authentication data, for example via a personal area network connection, and a managing module which forwards the remotely acquired identification and/or authentication data via the adaptor. The socket communication device provides the remotely acquired authentication data, via the authentication unit adaptor, to register the hosting cellular device with the visited cellular network. Optionally, the socket communication device is sized and shaped to fit into a space in the cellular device, for example as a slender element that fits in the space of a battery socket of the cellular device.

According to some embodiments of the present invention, there are provided methods and systems for connecting calls and/or sending messages to a cellular device of a user who is subscribed to a home cellular network when the cellular device is registered with a visited cellular network. These methods and systems are based on registering a gateway that is directly connected to the home cellular network by routing authentication and identification data requests and replies between the home cellular network and the cellular device via the gateway. The system allows a user who uses a socket communication device, for example as outlined above and described below, to receive calls and messages without using roaming services. Communication with the cellular device is done via a non cellular communication, such as a TCP/IP connection. This allows forwarding on-chip identification and/or authentication data, via a subscriber authentication unit socket of the cellular device, for example as outlined above and described below, to a gateway, such as a VoIP GSM Gateway. Then, the gateway uses the acquired data to register to the home cellular network of the user. This allows the gateway to connect calls and sending messages, which are designated to a number associated with the user, to the cellular device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
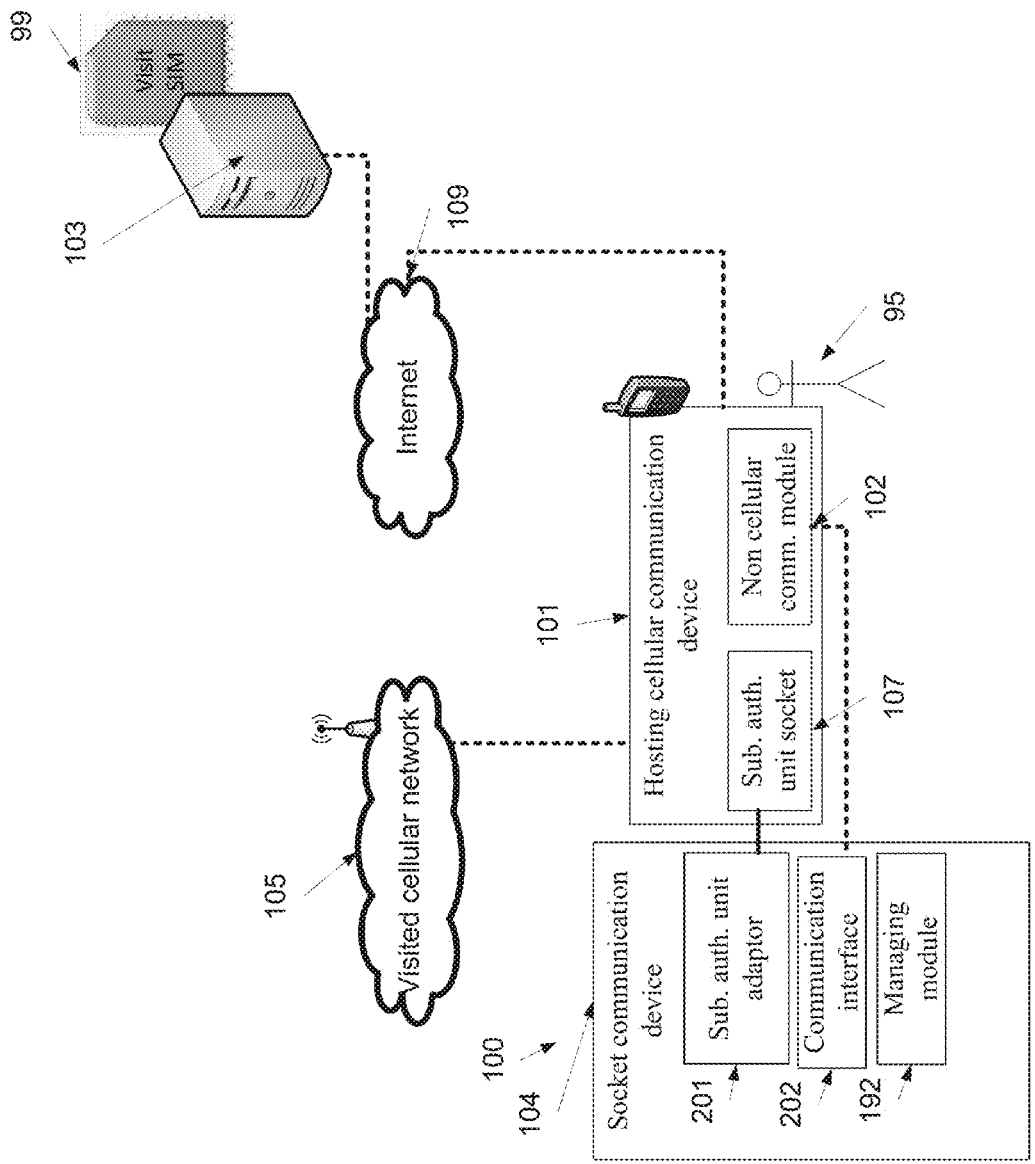

Reference is now made to FIGS. 1A-1B, which are schematic illustration of a system 100 for registering a cellular device 101 of a visiting user 95 by routing identification and/or authentication data of a subscriber of a visited cellular network 105 between a remote network node 103, such a server, and the visited cellular network 105, according to some embodiments of the present invention. As used herein, a visiting user of a cellular network 105 is a user that is associated with the cellular device 101 and not subscribed in advance to the services which are provided by the cellular network 105, for example a roaming user, such as an in country and/or out of the country roaming user. The cellular device 101 may be a mobile station (MS), a card accepting device (CAD) and/or mobile equipment (ME), such as a cellular phone, a Smartphone, a cellular modem, such as a cellular laptop modem and a cellular modem card.

The system 100 allows the cellular device 101 to use subscriber identifier(s) which are installed in a remote network node. The identification and/or authentication data is optionally of a subscriber of cellular network, such as a global system for mobile communications (GSM) network and universal mobile telecommunications system (UMTS) network. Optionally, the identification and/or authentication data allows generating replies to authentication requests, such as an international mobile subscriber identity (IMSI) and/or key based signed response (SRES_2).

The system 100 includes a non cellular communication module 102. As shown at FIG. 1A, the non cellular communication module 102 may be installed on a socket communication device 104 referred to herein as a socket communication device 104 or, as shown at FIG. 1B the non cellular communication module 102 may be installed on the cellular device 101 itself, for example as described below. For example, the non cellular communication module 102 may be an application installed in the memory of the cellular device 101, a standalone software module, an add-on to another software module of the cellular device 101, for example a set of one or more software components that adds capabilities to an application, such as the dialing service of the cellular device 101. The non cellular communication module 102 acquires the identification and/or authentication data from the remote network node 103, via a non cellular network 109, such as the Internet. The remote network node 103 may be referred to herein as visiting user server 103. Optionally, in use, for example when the user 95 roams, the non cellular communication module 102 establishes a communication session, such as a transmission control protocol internet protocol (TCP/IP) communication session, with the remote visiting user server 103. The communication session allows the non cellular communication module 102 to acquire remotely acquired identification and/or authentication data of the visited cellular network 105 and to forward request for this data. Optionally, the remote visiting user server 103 manages a plurality of subscriber identifiers of the visited network 105, for example a plurality of SIM cards and/or the data of a plurality of SIM cards. In such a manner, identification and/or authentication data may be acquired from these SIM cards, for example by communicating with the SIM cards. Optionally, the remote visiting user server 103 manages the allocation of the identification and/or authentication data to a plurality of roaming users and monitors the usage thereof. Optionally, the remote visiting user server 103 communicates with a billing server of one or more cellular network service providers at the visited area to determine, and optionally to log, charges which are associated with users which receive authentication data. The communication session is optionally established via a communication port of the hosting cellular device 101, for example using the wireless local area network (WLAN) interface of the cellular device 101.

Optionally, the non cellular communication module 102 includes or connected to software components which reside on the hosting cellular device 101 and manages the use of phone resources like network connections, dialing modules, phone book modules, callback management and the like. Additionally or alternately, the non cellular communication module 102 includes a non cellular transceiver for establishing a non cellular connection with the remote visiting user server 103.

The system 100 further includes a socket communication device 104. The socket communication device 104, which is optionally implemented as a microprocessor based printed circuit board (PCB), that is designed to receive remotely acquired identification and/or authentication data from the non cellular communication module 102 (or to host the non cellular communication module 102) and to use it for emulating a subscriber authentication unit, for example a smart card, such as a subscriber identification module (SIM) card.

The socket communication device 104 includes a subscriber authentication unit adaptor 201, hereinafter an adaptor 201, such as a SIM adaptor, which is designed for engaging with contacts of a subscriber authentication unit socket 107, such as a SIM socket, of the hosting cellular device 101. The adaptor 201 is optionally an integrated circuit (IC), optionally printed on a thin piece of substrate, such as silicon, for example a thin piece of about 0.10 millimeters. The data elements, which are transmitted between the socket communication device 104 and the subscriber authentication unit socket 107, are optionally defined according to an application protocol data unit (APDU) as defined by the ISO 7816 standards, which are incorporated herein by reference. In such an embodiment, the data elements are defined as transmission protocol data units (TPDU). The socket communication device 104 is optionally energized by a power source, such as a battery, of the hosting cellular device 101, optionally via the adaptor 201, for example using the energizing contacts of the subscriber authentication unit socket 107.

Optionally, in the embodiment depicted in FIG. 1B, the socket communication device 104 further includes a communication interface 202 for receiving remotely acquired identification and/or authentication data, for example requests and replies, from the non cellular communication module 102. Optionally, the communication interface 202 includes a wireless communication unit, such as a Bluetooth™ communication unit or any other personal area network (WPAN) communication unit, a Wi-Fi communication unit or any other WLAN communication unit, a proximity-card standard communication unit, for example as defined in ISO/IEC 14443 which is incorporated herein by reference, a near field communication (NFC) communication unit, STK/PDU communication unit and/or any similar communication unit. The communication interface 202 is adapted to communicate with a respective communication unit of the cellular device 101 so as to allow receiving remotely acquired identification and/or authentication data from the non cellular communication module 102.

After a remotely acquired identification and/or authentication data is received, the managing module functions, from the cellular device 101 point of view, as a subscriber authentication unit, such as a SIM card or a micro SIM card. The managing module provides the acquired data, for example the IMSI, via the SIM adaptor 201, to register the cellular device 101 to the visited cellular network 105. In use, the socket communication device 104 provides, via the subscriber authentication unit socket 107, all the identification and/or authentication data which are required for registering the cellular device 101 to the visited cellular network 105, for example as described below. The identification and/or authentication data is optionally provided to the cellular device 101 as known in the art, for example during a GSM authentication process. This allows the cellular device 101 to establish cellular communication session(s) with the remotely acquired identification and/or authentication data 99. The managing module 192 optionally emulates other functions of the emulated subscriber authentication unit, for example the functions of a SIM card or a micro SIM card.

Optionally, the socket communication device 104 is sized and shaped to fit into a space in the hosting cellular device 101. For example, the adaptor 201 is placed in the authentication unit socket and the rest of the socket communication device 104 may be fitted into an adjacent space in the hosting cellular device 101, for example the battery socket, between internal electric components and a battery and/or into an internal space of the hosting cellular device 101 (depends on the structure of the hosting cellular device 101). For example, the dimensions of the socket communication device 104 are of a slender element, for example a width of less than 0.1 millimeters and a foot print of few square centimeters. In such an embodiment, the socket communication device 104 may include a slender housing for containing some or all of its elements.

According to some embodiments of the present invention, the socket communication device 104 is adjusted to switch between on-chip identification and/or authentication data that is received from a home subscriber authentication unit, for example a local SIM card that is connected thereto, and the identification and/or authentication data that is received as outlined above and further described below. For example, reference is also made to FIG. 2, which is a schematic illustration of an exemplary socket communication device for emulating a SIM card using a remotely acquired identification and/or authentication data acquired over a non cellular connection. The exemplary socket communication device 224 includes an exemplary adaptor 195 that is adapted for fitting into a SIM card socket, and the managing module 192 which is connected to a communication interface for acquiring a remotely acquired identification and/or authentication data and used to manage the access to the received remotely acquired authentication data. The exemplary socket communication device 224 includes a subscriber authentication unit socket 207 for hosting the home subscriber authentication unit 197, for example a SIM card.

Optionally, the adaptor 195 intercepts the communication between a SIM card hosted in the subscriber authentication unit socket 197 and the hosting cellular device 101 and creates new interface between the hosted SIM card and the application layer of the hosting cellular device 101.

Figure 2:
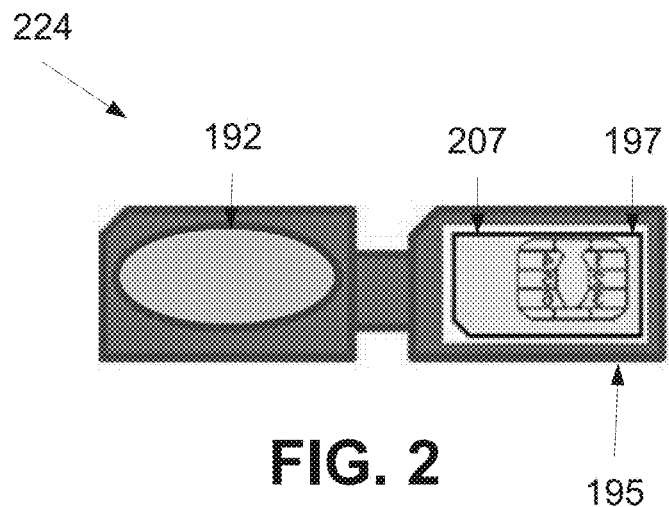
FIG. 2 is a schematic illustration of an exemplary socket communication device for acquiring and routing identification and/or authentication data, according to some embodiments of the present invention.

In the embodiment depicted in FIG. 2, the exemplary adaptor 195 and the authentication unit socket 207 are designed to be installed in the SIM house. Optionally, a flexible and conductive band connects the adaptor 195 to the managing module 192 and other functional elements. The local subscriber authentication unit 197 may function as a home authentication unit (SIM) that is installed in the hosting cellular device 101 and optionally registered with a mobile gateway operated in a home cellular network of a home cellular service provider, for example as described below in relation to FIG. 5. Optionally, a number of subscriber authentication unit sockets are connected to the authentication unit socket communication device 104, facilitating alternately using a number of subscriber authentication units, each as described above.

The socket communication device 104 optionally includes a switch. The switch is optionally controlled by the managing module 192 that is installed in the socket communication device 104. Optionally, the managing module 192 receives instruction(s) to operate the switch from a control module that is installed on the hosting cellular device 101. Optionally, the managing module 192 presents a graphical user interface (GUI) on the display of the hosting cellular device 101 to allow the user 95 to select whether she wants to use the home subscriber identity 98 from the local subscriber authentication unit or remotely acquired identification and/or authentication data 99.

Figure 3:
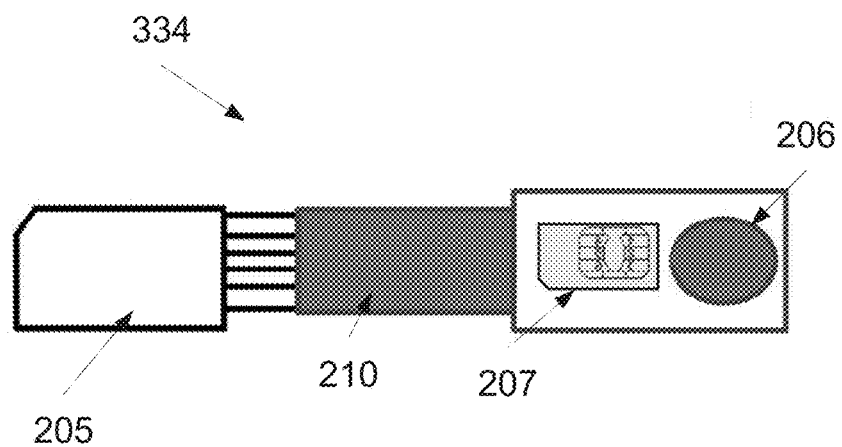
FIG. 3 is a another schematic illustration of an exemplary socket communication device having an extended structure, according to some embodiments of the present invention.

Another example is depicted in FIG. 3, which is another schematic illustration of an exemplary extended socket communication device 334 for emulating a SIM card using remotely acquired identification and/or authentication data and having a local SIM card socket 205 for a local SIM card, according to some embodiments of the present invention. The exemplary socket communication device 104 includes an exemplary adaptor 205 that is adapted for fitting into a SIM card socket. The exemplary adaptor 205 is wired a subscriber authentication unit socket 207 that is located, with the functional elements and the managing module 192, at another segment of the exemplary socket communication device 104. This segment is set to be outside of the subscriber authentication unit socket 107 of the hosting cellular device 101. Optionally, the segment is connected to the exemplary adaptor 205 using a flexible conductive band 210. This arrangement provides more space for implementation various hardware implementations and may be used with various authentication unit sockets. In such an embodiment, the segment may be outside of the housing of the hosting cellular device 101.

Figure 4B:
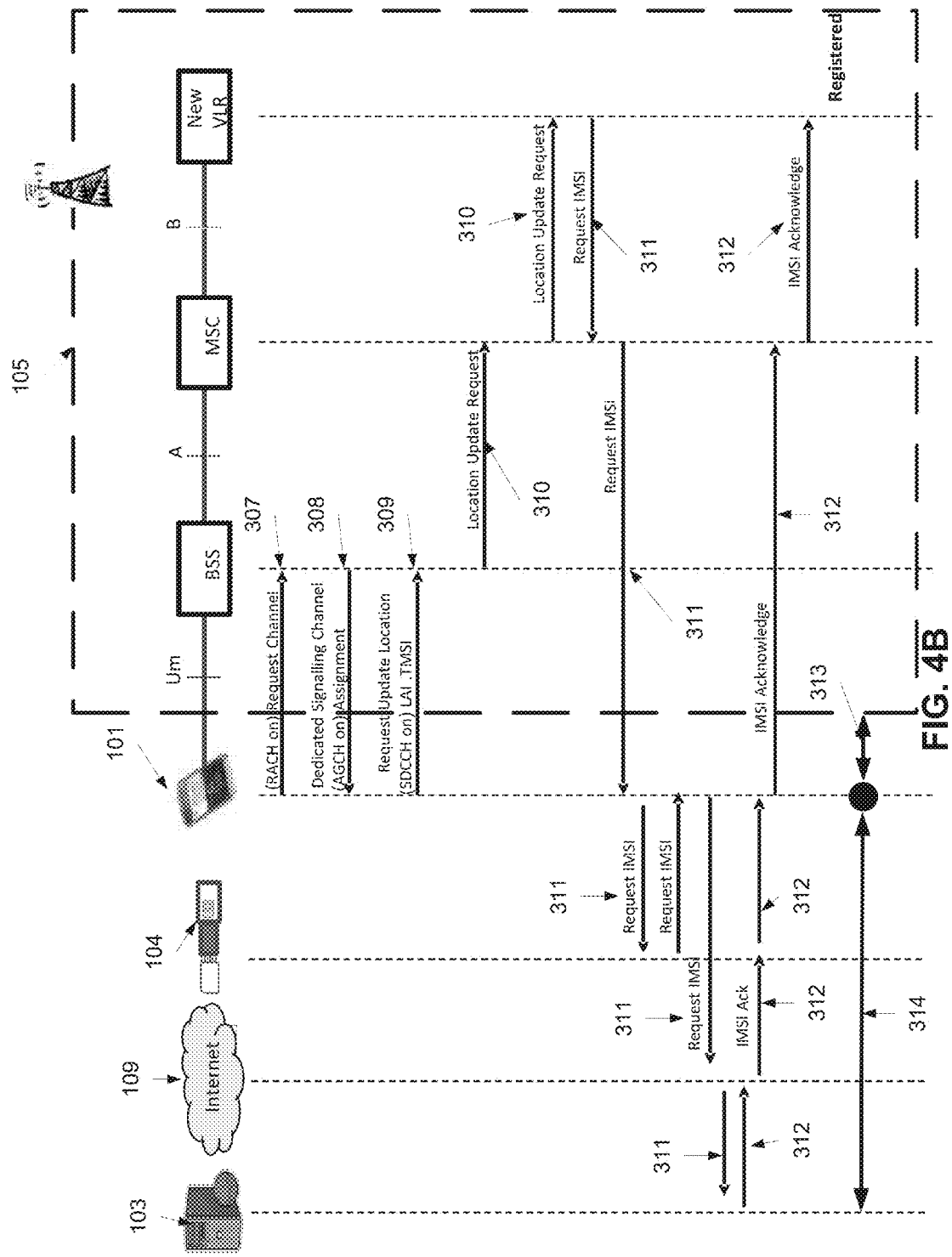

Reference is now also made to FIGS. 4A and 4B, which are sequence diagrams 300 of processes of a method for registering a cellular device by routing requests for identification and/or authentication data and replies that contain identification and/or authentication data, according to some embodiments of the present invention.

FIG. 4A depicts a process for allocating identification and/or authentication data of a subscriber of a visited network to a cellular device, such as 101, using the socket communication device 104.

First, as shown at 301, the cellular device identifies a roaming state, for example by analyzing the communication pattern and notifies the exemplary socket communication device 104. As shown at 302, the exemplary socket communication device 104 reply an acknowledge message. Now, as shown at 303, a request for the allocation of authentication and identification data is sent to the visiting user server 103. It should be noted that this request may be sent from the cellular device 101 and/or the socket communication device 104, for example as described above. The request is optionally sent as a hypertext transfer protocol (HTTP) message over the network 109 to the remote visiting user server 103. The request is optionally transmitted using the communication port of the hosting cellular device, for example using a WLAN communication unit. The request optionally includes the identity of the requestor. The visiting user server 103, as shown at 304, associates a subscriber identity, such as an IMSI, with the subscriber. Optionally, the visiting user server 103 communicates with a billing platform to verify an association between an allocated subscriber identity and the requestor. Optionally, the visiting user server 103 logs the association and/or monitors billing pertaining to the subscriber identity. Now, as shown at 305, a response to the request, with the requested visiting subscriber identity, is sent to the cellular device 101, via the network 109. The response is received at the hosting cellular device 101, for example by the non cellular communication module 102. Then, as shown at 306, the remotely acquired identification and/or authentication data 99 is forwarded, for example via a WPAN connection, to the socket communication device 104.

FIG. 4B depicts a process for using the allocated identification and/or authentication data for the registration of the cellular device in the visited GSM network, using the socket communication device 104, according to some embodiments of the present invention.

As shown at 307, 308, 309, when the cellular device 101 starts up, it communicates with the cellular base station substation (BBS) of the visited network 105. The communication is over common control channels (CCCH). The request to connect to the network is send via the random access channel (RACH). The access grant channel (AGCH) downlink channel AGCH answers to the RACH request and the BSS assigns a signaling channel (SDCCH) to the cellular device 101. Now, as shown at 310 a location update intra network request is sent to the visitor location register (VLR) of the visited network 105 via the mobile services switching center (MSC). The VLR requests for an International Mobile Subscriber Identity (IMSI). This request, which is optionally with a PIN, is forwarded, via the BSS, to the cellular device 101 that forwards it, via the non cellular communication module 102, as shown at 311, to the visiting user server 103. Optionally, the visiting user server 103 pass the PIN to a local SIM card to extract the IMSI therefrom. As shown at 312 the visiting user server 103 replies to the request with an IMSI that is sent to the non cellular communication module 102. The IMSI is forwarded to the cellular device 101 via the subscriber authentication unit socket 107. The cellular device 101 transmits the IMSI as a reply message to the request, as shown at 312. This allows establishing a connection between the cellular device 101 and the authentication center (AuC) of the visited network 105, for example for verifying of the IMSI. The AuC searches its database for the incoming IMSI and its associated $K_i$. The AuC then generates a random number (RAND, which is a nonce) and signs it with the $K_i$ associated with the IMSI, computing another number known as signed response 1 (SRES_1). The AuC then sends the RAND to the cellular device 101, which passes it, as shown at 314, to the visiting user server 103. It should be noted that 313 and 314 depicts a bidirectional connection that is established between the respective units. The visiting user server 103 forwards the RAND to the respective SIM card which signs it with its $K_i$, producing signed response 2 (SRES_2) which is send to the cellular device 101 along with encryption key denoted herein as $K_c$. The cellular device 101 passes SRES_2 on to the operator network 105. The operator network 105 then compares its computed SRES_1 with the computed SRES_2 that the cellular device 101 returned. If the two numbers match, the cellular device 101 is authenticated and granted with access to the visited network 105. $K_c$ is used to encrypt all further communications between the cellular device 101 and the visited network 105. It should be noted that the bidirectional connections 313, 314 allows the user to use the cellular device 101 as a local user and not as a roaming user. After registration, the communication with the cellular network may be done numerous times after the remotely acquired identification and/or authentication data 99, for example for verifying the identification and/or authentication data 99 by matching key encryption. After the remotely acquired identification and/or authentication data 99 is registered, the user 95 may call and/or send messages for a cost of a local user, without roaming.

According to some embodiments of the present invention, the remotely acquired identification and/or authentication data 99 is provided to users who travel away from the coverage range of their home service provider. By allowing such a user to receive a remotely acquired identification and/or authentication data of a visited service provider, roaming is avoided. In such a manner, high cost of roaming communication may be saved. It should be noted that as the communication with the visiting user server 103 is performed over the communication network 109 and not over a cellular network, the visiting user server 103 may be accessed from various geographic locations.

Figure 4C:
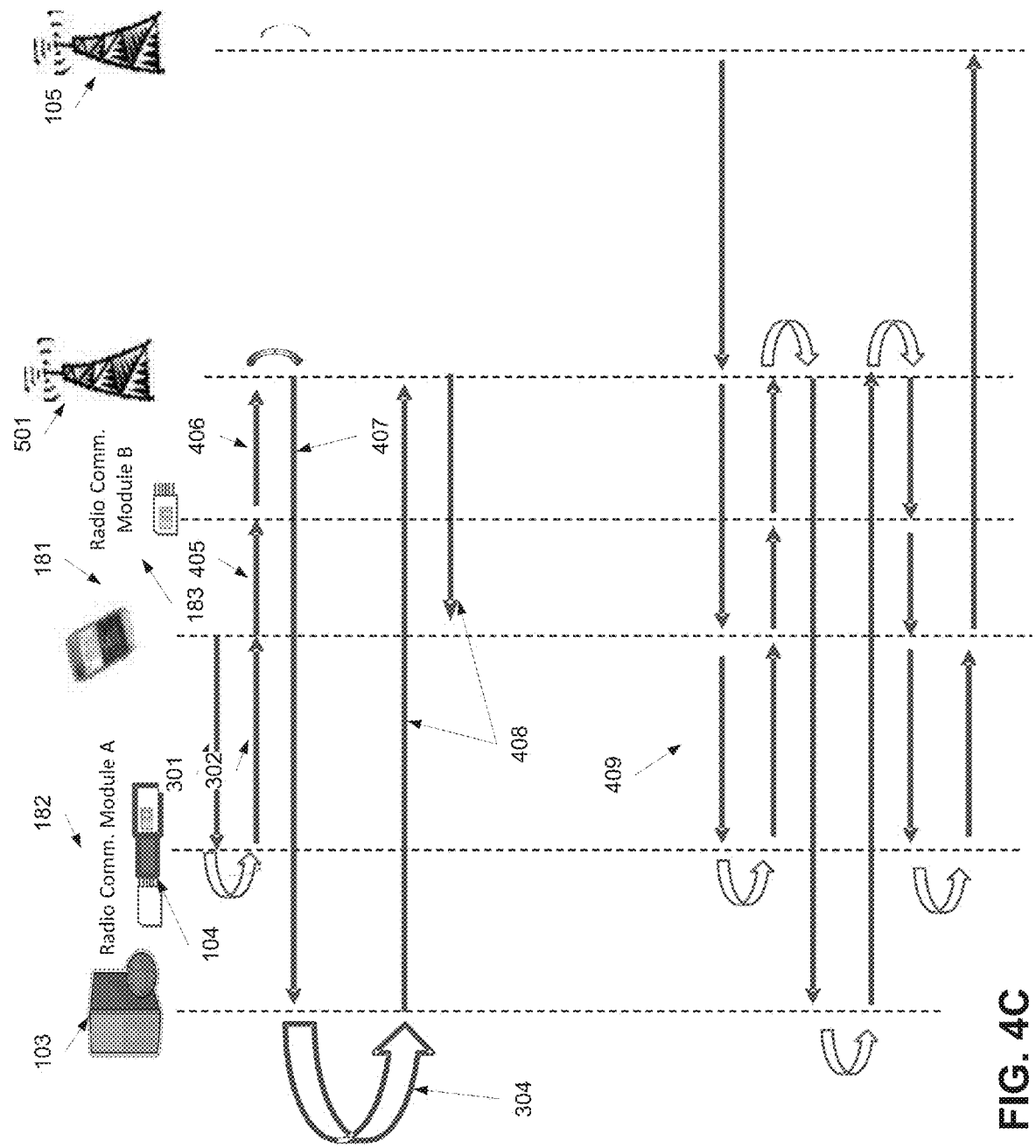
FIG. 4C is a sequence diagram of a process of a method for registering remotely a multi SIM card, with multi mobile circuits integrated into a single cellular device (for example Dual SIM Dual Standby (DSDS) for device with two mobile circuits) using remotely acquired identification and/or authentication data, according to some embodiments of the present invention.

Reference is now made to FIG. 4C, which is a schematic illustration of a flow chart wherein a system, which is similar to the system depicted in FIG. 1 is used for registering a multi SIM cellular device 181, such as a dual SIM dual Standby cellular device, using one of its radio communication modules for establishing a cellular communication connection with a remote network node over a cellular communication network and acquiring identification and/or authentication data of a subscriber of a another cellular network from the remote network node over the cellular communication connection, according to some embodiments of the present invention.

The dual SIM dual Standby cellular device includes a plurality of mobile circuits, for example a DSDS for a device with two mobile circuits. The difference of using a multi SIM cellular device 181 instead of a standard one is the possibility to use one of its radio communication modules which are using separate mobile communication ports, referred to herein as radio communication modules A or B, to establish a cellular connection, and not a non cellular connection, with the remote network node 103 for acquiring a visiting subscriber information.

A multi SIM cellular device 181 has two or more communication modules radios and two or more respective SIM card slots that may be simultaneously connected to cellular network(s) to receive and/or establish calls. In FIG. 4C, radio communication modules A and B are marked. The multi SIM cellular device 181 may be used one of its radios to register to a certain cellular network, such as a home cellular network 501, using a SIM card, such as a home SIM card. After the registration, a connection with the remote network node 103 may be established to acquire identification and/or authentication data 99 of a subscriber of another cellular network, such as a visited cellular network. For example, numeral 301, 302, 304, 405-408 in FIG. 4C depicts communication legs which are used to acquire a visiting subscriber identity. Numeral 301, 302, and 304 are as described above. Numerals 405-407 depict forwarding a request for the visiting subscriber identity to the remote network node 103 via a cellular connection with the home cellular network 501 that is established using radio communication module B. A response to the request, with the requested visiting subscriber identity, is sent to the cellular device 101, via the network 501, as shown at 408.

The visiting subscriber identity may now be used for registering the dual SIM device 181 to the visited network 105 via radio communication module A. As shown at 409, during the registration, a connection with the network node 103 is established. This may be done similarly to the described above regarding FIG. 4B. One of the differences is that a cellular connection that is established via the home network using radio communication module B is used instead of the aforementioned non cellular connection. The communication depicted in numeral 409 of FIG. 4C is an exemplary registration process wherein the visited network 105 requests for an IMSI which is acquired from the remote network node 103 via the socket communication device 104 using the home cellular network connection.

Reference is now made to a solution that allows, inter alia, a user, who travels to an area, which is not covered by his home cellular network, such as 95, to receive calls and/or messages which are designated to his cellular number. The solution allows these calls and/or messages to be received without using an international leg of a cellular service provider.

Figure 5:
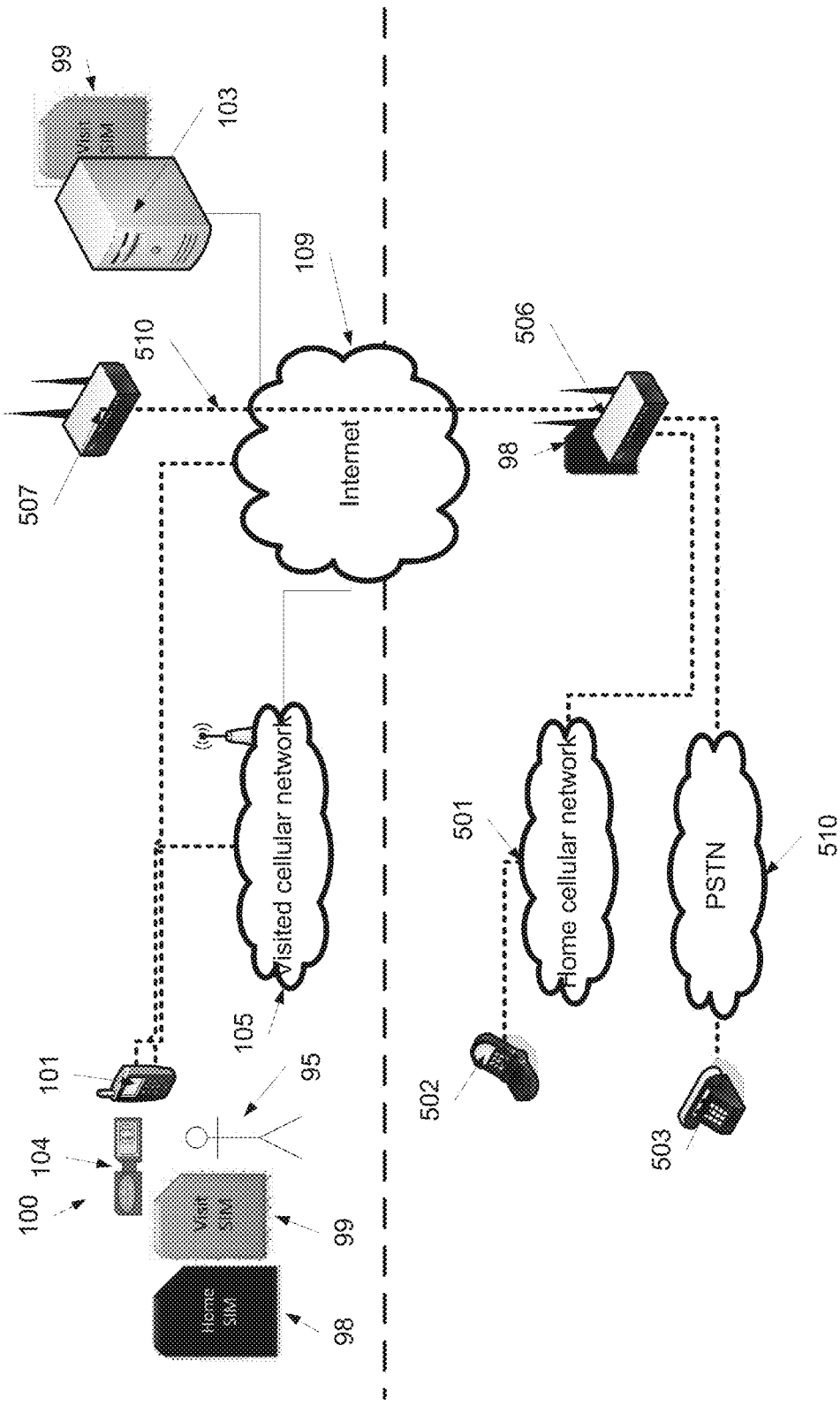
FIG. 5 is a schematic illustration of a system for connecting calls and sending messages to a home cellular device that roams to a remote location, according to some embodiments of the present invention.

FIG. 5 is a schematic illustration of the system 100 and the visiting user server 103 which are depicted in FIG. 1 and a gateway 506 that routes requests and replies from and to a cellular device of a traveling user of a home cellular network 501, according to some embodiments of the present invention. The cellular device is optionally registered to the visited cellular network 105.

It should be noted that gateways, such as 506, may be installed in a plurality of cellular networks in different countries and/or geographical regions, forming a network of remote network nodes that allows establishing non cellular communications therebetween. While the visiting user server 103 provides identification and/or authentication data to register with the visited cellular network 105, the gateway 506 establishes cellular communication sessions, such as international calls and/or 3G based connections and/or non cellular communication sessions, such as a voice over internet protocol (VoIP) communication session, between peers which are calling the visiting user 95. For example, the call forward gateway 506 is optionally a VoIP global system for mobile communications (GSM) Gateway which enables direct routing between IP networks, digital networks, and/or analog networks and GSM networks.

Figure 6:
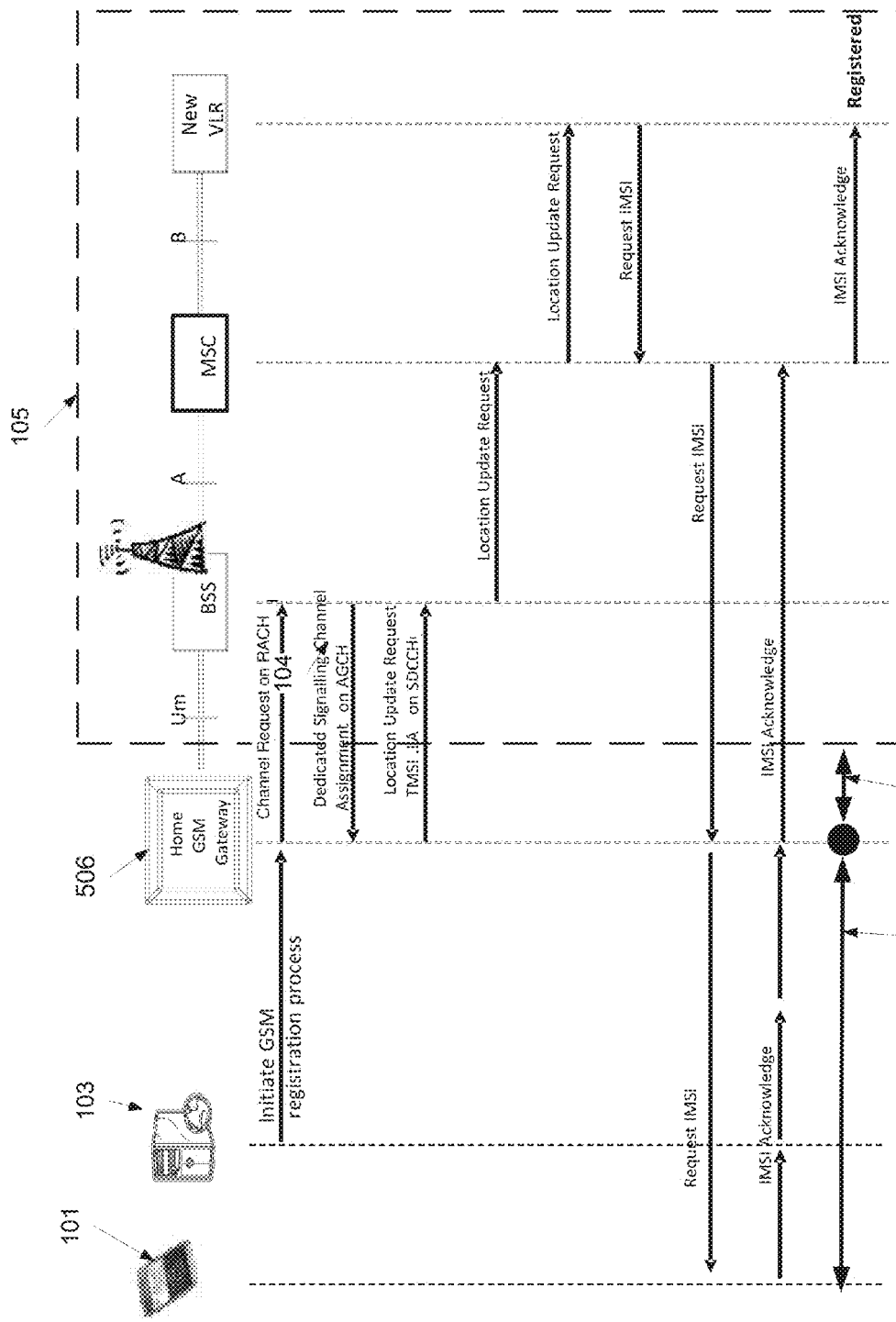
FIG. 6 is a sequence diagram of a method for forwarding calls and/or messages to a traveling user, according to some embodiments of the present invention.

Optionally, as shown in the flowchart depicted in FIG. 6, the visiting user server 103 updates the gateway 506 about the roaming of the hosting cellular device 101. The hosting cellular device 101 then initiates an identification and authentication process as if it is the hosting cellular device 101. In these embodiments, requests which are received from the home cellular network 501 for identification and authentication are forwarded to the authentication unit 98 that is installed in the socket communication device 104. The forwarding is performed via the visiting user server 103 that is connected to the gateway 506 over a non cellular connection, such as an IP connection. For example, FIG. 6 depicts such a communication process.

After the registration, calls and/or messages are forwarded to the hosting cellular device 101 via cellular and/or non cellular communication session(s), for example as described below. These calls and/or messages may be received from another subscriber of the local cellular network 501, a landline user 503, and/or a voice call service user 505, using any client terminal, such as a laptop, desktop, Smartphone, tablet, and the like. Optionally, the gateway 506 contacts another gateway, referred to herein as a visiting gateway 507. The visiting gateway 507 connects the call, via the visited cellular network 105, to the visiting user 95, using a number associated with the remotely acquired identification and/or authentication data 99. In such embodiments, the visiting user 95 may receive and participate in calls, which are directed to his cellular number without being charged for international cellular based communication as the leg between the cellular networks 105, 501 is a non cellular communication session, optionally a VoIP communication session between gateways 506, 507. For example in FIG. 5, this leg is marked with numeral 510. After the registration process, as shown at 611 and 612, communication may be established between the gateway 506 and the hosting cellular device 101 to acquire identification and/or authentication data from the home authentication unit 98.

It is expected that during the life of a patent maturing from this application many relevant methods and systems will be developed and the scope of the term a computing unit, and an adaptor, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for registering a cellular device, comprising:
a processor and a memory embodying executable instructions which, when executed by the processor function as a non cellular communication module which establishes a non cellular communication connection with a remote network node over a non cellular communication network and acquires identification and authentication data of a subscriber of a visited cellular network from said remote network node over said non cellular communication connection;
a subscriber authentication unit adaptor configured for engaging with contacts of a subscriber authentication unit socket of a hosting cellular device; and
a managing module which receives said identification and authentication data from said non cellular communication module and provides said identification and authentication data to a communication interface of said authentication unit adaptor;
wherein said authentication unit adaptor forwards said identification and authentication data to said hosting cellular communication so as to allow to registering said hosting cellular communication to said visited cellular network;
wherein said non cellular communication module being installed on said hosting cellular device;
wherein said non cellular communication module acquires said identification and authentication data via a communication port of said hosting cellular device;
wherein said subscriber authentication unit adaptor and said managing module are installed in a socket communication device which further comprises an integrated subscriber identification module (SIM) card socket for engaging with contacts of a SIM card hosting an on-chip authentication data, said socket communication device provides said on-chip identification and authentication data via said subscriber authentication unit adaptor to register said on-chip identification and authentication data in a home cellular network.

2. The system of claim 1, wherein said identification and authentication data comprises an international mobile subscriber identity (IMSI).

3. The system of claim 1, wherein said communication interface comprises a wireless communication unit for establishing a wireless connection with said hosting cellular device, said identification and authentication data being provided via said wireless connection.

4. The system of claim 1, wherein said non cellular communication module acquires said identification and authentication data by establishing a non cellular communication session with said remote network node using a non cellular communication interface of said hosting cellular device.

5. The system of claim 1, wherein said subscriber authentication unit socket is a subscriber identification module (SIM) card socket.

6. The system of claim 1, wherein said socket communication device further comprises a switch for switching between a first connection between said integrated SIM card socket and said subscriber authentication unit adaptor and a second connection between said managing module and said subscriber authentication unit adaptor.

7. A method for registering a cellular device, comprising:
establishing a non cellular communication connection over a non cellular communication network between a cellular device and a remote network node;
receiving from a visited cellular network, at said cellular device, at least one request for at least one of identification and authentication of a subscriber during a network registration process;
routing said at least one request, via said non cellular communication connection, to said remote network node;
receiving from said remote network node, by a managing module, identification and authentication data, and providing said identification and authentication data to a communication interface of said authentication unit adaptor;
forwarding said identification and authentication data by said authentication unit adaptor to said hosting cellular communication; and
routing at least one response to said at least one request, via said non cellular communication connection, to said visited network so as to
register said cellular device to said visited cellular network;
wherein said subscriber authentication unit adaptor and said managing module are installed in a socket communication device which further comprises an integrated subscriber identification module (SIM) card socket for engaging with contacts of a SIM card hosting an on-chip authentication data, said socket communication device provides said on-chip identification and authentication data via said subscriber authentication unit adaptor to register said on-chip identification and authentication data in a home cellular network.

8. The method of claim 7, wherein said routing at least one response comprises acquiring identification and authentication data of said subscriber over said non cellular communication connection;
forwarding said identification and authentication data to said cellular device via a subscriber authentication unit socket thereof; and
registering said cellular device to said visited cellular network using said authentication data.

9. The method of claim 8, further comprising detecting an initiation of a roaming process on said hosting cellular device and halting said roaming process in response to said detection.

10. The method of claim 8, further comprising using an integrated subscriber authentication unit socket to acquire on-chip identification and authentication data from a subscriber authentication unit engaged therewith; wherein said registering comprises identifying a location of said hosting cellular device and determining accordingly whether to provide said identification and authentication data or said on-chip identification and authentication data to said hosting cellular device via said subscriber authentication unit socket.

11. The method of claim 8, further comprising:
using said non cellular communication connection to acquire an additional identification and authentication data from said remote network node;
providing said hosting cellular device with said additional identification and authentication data via said subscriber authentication unit socket; and
registering said hosting cellular device to another visited cellular network using said additional identification and authentication data.

12. The method of claim 7, wherein said routing at least one response comprises routing said at least one response via a subscriber authentication unit socket of said cellular device.

13. The method of claim 7, wherein said remote network node is a gateway connected to; a home cellular network of said subscriber; further comprising;
connecting local calls received at said gateway via said home cellular network to said cellular device.

14. The method of claim 13, wherein said connecting is performed by using an international leg of a cellular service provider.

15. The method of claim 13, wherein said connecting is performed via said communication connection.

16. The method of claim 13, wherein said at least one request comprises routing said at least one request via a subscriber authentication unit socket of said cellular device.

17. A system for establishing a communication session between cellular peers, comprising:
a socket communication device, engaged with a subscriber authentication unit socket of a cellular device to provide, via said subscriber authentication unit socket, remotely acquired identification and authentication data for registration of a user with a first cellular network;
a first gateway, connected to said first cellular network, which registers on-chip identification and authentication data associated with said user with said first cellular network;
a second gateway connected to a second cellular network; and
a processor and a memory embodying executable instructions which, when executed by the processor function as a network node which in response to receiving a request for the allocation of said identification and authentication data transmitted over a non cellular connection with said cellular device when said cellular device identifies a roaming state, transmits said remotely acquired identification and authentication data over said non cellular connection with said cellular device, said cellular device forwards said remotely acquired identification and authentication data to said socket communication device
wherein said first gateway establishes a voice over internet protocol (VoIP) connection with said second gateway when a call is received for said user from a peer so as to establish a communication session between said user and said peer using said VoIP connection, over said first and second cellular networks;
wherein a subscriber authentication unit adaptor and a managing module are installed in a socket communication device which further comprises an integrated subscriber identification module (SIM) card socket for engaging with contacts of a SIM card hosting an on-chip authentication data, said socket communication device provides said on-chip identification and authentication data via said subscriber authentication unit adaptor to register said on-chip identification and authentication data in a home cellular network.

* * * * *